United States Patent
Chaskar et al.

(10) Patent No.: US 7,751,818 B2
(45) Date of Patent: Jul. 6, 2010

(54) SMART INTER-TECHNOLOGY HANDOVER CONTROL

(75) Inventors: Hemant M. Chaskar, Woburn, MA (US); Dirk Trossen, Cambridge, MA (US)

(73) Assignee: Nokia Corporation, Espoo (FI)

(*) Notice: Subject to any disclaimer, the term of this patent is extended or adjusted under 35 U.S.C. 154(b) by 424 days.

(21) Appl. No.: 10/705,973

(22) Filed: Nov. 13, 2003

(65) Prior Publication Data

US 2004/0137902 A1 Jul. 15, 2004

Related U.S. Application Data

(60) Provisional application No. 60/426,385, filed on Nov. 15, 2002.

(51) Int. Cl.
*H04W 36/00* (2009.01)
(52) U.S. Cl. .............. 455/436; 455/439; 455/440; 455/443
(58) Field of Classification Search .............. 455/436, 455/439, 440, 443
See application file for complete search history.

(56) References Cited

U.S. PATENT DOCUMENTS

| | | | |
|---|---|---|---|
| 5,594,718 A | | 1/1997 | Weaver, Jr. et al. |
| 6,473,413 B1 * | | 10/2002 | Chiou et al. .............. 370/331 |
| 6,725,044 B2 * | | 4/2004 | Verma et al. .............. 455/444 |
| 7,039,027 B2 * | | 5/2006 | Bridgelall .................. 370/329 |
| 7,039,409 B2 * | | 5/2006 | Lobinger et al. .......... 455/443 |
| 7,149,524 B2 * | | 12/2006 | Reynolds .................. 455/437 |

FOREIGN PATENT DOCUMENTS

| WO | WO 96/25015 | * 8/1996 |
|---|---|---|
| WO | WO 99/48320 | 9/1999 |
| WO | WO 00/67514 | * 11/2000 |

OTHER PUBLICATIONS

Janise McNair, et al, "An Inter-System Handoff Technique for the IMT-2000 System," 2000, pp. 208-216.*
J. McNair, et al, "*An Inter-System Handoff Technique for the IMT-2000 System*", INFOCOM 2000, Nineteenth Annual Joint Conference of The IEEE Computer and Communications Societies, Proceedings, IEEE Tel Aviv, Israel Mar. 26-30, 2000, Piscataway, NJ, USA, IEEE, US Mar. 26, 2000, pp. 208-216, XP010376022 ISBN 0-7803-5880-5.
R. Koodll, "Fast Handovers for Mobile IpV6 Draft-ietf-mobileip-fast-mipv6-05.txt", Sep. 30, 2002, pp. 1-46.
Karim El Malki, et al, Lower Latency Handoffs in Mobile Ipv4<drafat-ietf-mobileip-lowlatency-handoffs-v4-04.txt>, Dec. 2002, pp. 1-50.
Dirk Trossen, et al, "Issues in Candidate Access Router Discovery for seamless IP-level handoffs", Oct. 16, 2002, pp. 1-9.

* cited by examiner

*Primary Examiner*—Patrick N Edouard
*Assistant Examiner*—Chuck Huynh
(74) *Attorney, Agent, or Firm*—Foley & Lardner LLP

(57) ABSTRACT

A method and apparatus for controlling handover between a first technology network and a second technology network by detecting information about regions of an area of the first technology network, and deciding whether to initiate a handover procedure between the first and second technology networks based on the detected region information.

12 Claims, 9 Drawing Sheets

SMART INTER-TECHNOLOGY HANDOVER CONTROL

The present application claims the benefit of priority of provisional application Ser. No. 60/426,385, filed Nov. 15, 2002, the contents of which are incorporated herein by reference.

FIELD OF THE INVENTION

The present invention relates to controlling handover between a first technology network and a second technology network.

BACKGROUND OF THE INVENTION

To illustrate a conventional handover between a first and a second technology network the handoff scenario depicted in FIG. 1 is considered. FIG. 1 shows a footprint of a first technology network, e.g. WLAN (Wireless Local Access Network), in a hot spot, which in this case is an indoor environment such as a hotel. The bright circles indicate strong signal footprints of different WLAN access points APs located at the hot spot, while the gray circle indicates a strong signal footprint of an access node of a second technology network, e.g. a cellular base station. As it is shown in FIG. 1, the WLAN geographical coverage area is subsumed in a cellular geographical coverage area, as typically is the case in practice.

It is supposed that a mobile user having multi-radio (WLAN and cellular) mobile terminal initiates an Internet session over WLAN access and walks along the path shown in FIG. 1 by dotted line. Furthermore, it is supposed that the user has chosen WLAN as the preferred access to the IP network. This is mainly because WLAN access it typically cheaper and faster than cellular access. However, the user also wants the connectivity to be seamlessly handed over to the cellular network when WLAN coverage is not available anymore.

According to the conventional technology, initiating such inter-technology handoff mainly is based on a signal strength criterion. This has disadvantages such as causing spurious handoff triggers when the user is still within the WLAN footprint but looses connectivity due to short gaps in the coverage as can be seen from FIG. 1. This is because at such gaps the mobile terminal might sense a diminishing WLAN signal but a strong cellular signal.

For example, along his path shown in FIG. 1, when the user comes in an area where WLAN signal strength drops due to local factors such as metal objects, walls etc., the mobile terminal detects a drop in WLAN signal strength, but a strong cellular signal. Based on the signal strength criterion alone, the mobile terminal will immediately try to initiate handoff from WLAN to cellular network. However, moments later the mobile terminal again detects strong signal from WLAN, and hence, initiates handoff back to WLAN network. Such a ping-pong effect is undesirable as it causes unnecessary signaling traffic as well as may cause more disruption in service than what would have been caused due to lack of WLAN signal for a short while.

Of course, the mobile terminal could wait for a short interval of time after the loss of WLAN signal before initiating handoff to the cellular network. However, this degrades the (latency) performance of handoff when the user really exits the hotel door, and hence, loses WLAN connectivity for real.

A further problem encountered with the prior art mainly relying on the signal strength criterion is the difficulty in implementing proactive procedures of handoff.

The performance of inter-technology handoff (or IP-layer handoff in general) can be improved if some of the handoff messaging can be done proactively, i.e., while the mobile terminal still sees a strong WLAN signal. These proactive steps could include, for example, acquiring the cellular network, performing Mobile IP Fast Handoff signaling as described in "Low Latency Handoffs in Mobile IPv4", Internet draft, draft-ieff-mobileip-lowlatency-handoffs-v4-04.txt, June 2002, and "Fast Handovers for Mobile IPv6", Internet draft, draft-ietf-mobileip-fast-mipv6-05.txt, September 2002, authenticating with the cellular network, performing Candidate Access Router Discovery as described in "Issues in Candidate Access Router Discovery for Seamless IP layer Handoffs", Internet draft, draft-ieff-seamoby-cardiscovery-issues-04.txt, October 2002, informing the target network about QoS (Quality of Service) and other requirements of current applications, etc. Then, as soon as the WLAN signal strength diminishes, the mobile terminal can send a final trigger to the cellular network to complete the handoff process (i.e., actually commit the radio resources, arrange for packet rerouting, etc.).

However, the need for handoff has to be anticipated with enough margin for the execution of proactive handoff steps. It is not possible to do this reliably based on signal strength measurements alone. For example, if the proactive handoff procedures are started after WLAN signal strength starts to decline noticeably, the Internet connectivity of the mobile terminal may disappear before connectivity can be established with the cellular network. On the other hand, if handoff procedures are started too early (when WLAN signal is still strong), it may result in large number of false starts. In other words, the mobile user may never actually leave the WLAN coverage (e.g. he is sitting in a hotel room when call is initiated over WLAN), even though proactive handoff steps have been started. This may create unnecessary signaling burden on the network.

According to the WO 99/48320, certain gateway cells are used for controlling handovers in and outside a building for controlling pico/macro cell handovers. A gateway cell contains information on neighboring cells in it's neighbor list. However, the WO 99/48320 requires that the networks are controlled by the same operator.

Moreover, in the WO 96/31078, a method is disclosed which is used to indicate a border crossing which is based on mobile node listening to a pilot signal from outside the border, informing about that to a BSC (Base Station Controller), and indicating the border crossing from the BSC to the mobile node.

SUMMARY OF THE INVENTION

It is therefore an object of the present invention to improve inter-technology handover control so that spurious handoff triggers can be avoided and the need for handoff can be anticipated with enough margin for the execution of proactive handoff steps.

This object is achieved by various methods of controlling handover between a first technology network and a second technology network. Furthermore, this object is achieved by various mobile nodes for controlling handover between a first technology network and a second technology network and an access node of the first technology network, as well as a communication network system which includes a mobile node and the access node.

The invention enables smart detection of hot spot (such as 802.11 WLAN or HiperLAN) border crossing. Such movement detection (in addition to conventional signal strength criterion) can assist the mobile nodes in making smart inter-technology handoff decisions.

According to the present invention, it can be detected whether a user of a mobile node is well within a WLAN footprint, roaming near the boundary of it or has left hot spot premises, and smart handoff decision policies can be implemented.

The invention provides a method which:
1. can reduce the number of spurious handoff triggers without delaying the handoff trigger when it indeed needs to happen,
2. can reduce the number of false starts (of handoff preparation) in proactive handoff schemes,
3. make the implementation of proactive handoff schemes efficient by enabling the mobile terminal to complete handoff preparation while the signal from WLAN is still strong, and
4. enable implementation of user policies to be described in the following.

The methods of the present invention includes detecting information about regions of an area of the first technology network, and deciding initiating a handover procedure between the first and second technology networks based on the detected region information. Prior to the detecting and deciding steps the present invention provides arranging border access nodes for accessing the first technology network at border regions of an area of the first technology network, the border access nodes indicating information about a border region, and arranging non-border access nodes for accessing the first technology network at non-border regions of the area of the first technology network. As per the present invention the non-border access nodes indicate information about a non-border region.

The mobile node of the present invention includes means for detecting information about regions of an area of the first technology network, and means for deciding initiating a handover procedure between the first and second technology networks based on the detected region information. Further according to the present invention the means for detecting can alternately perform detecting information about a border region which is transmitted by border access nodes for accessing the first technology network which are located at border regions of an area of the first technology network and information about a non-border region which is transmitted by non-border access nodes for accessing the first technology network which are located at non-border regions of the area of the first technology network.

The access node of the present invention includes means for setting information about at least a first region and a second region of an area of the first technology network in which region the access node is located, and means for transmitting the region information.

Furthermore, the invention is very simple to implement, and very feasible for WLAN hot spots, where the real estate owner has very good idea of what access points are on the border of the coverage.

According to the present invention, the logic to use the border bit and the handover decision is in the mobile node only, and the indication of the border is only (or in addition to other information) the border bit in the beacon. Hence, in addition to differing network technologies, the invention does not require a single operator for both inner and outer network parts.

DETAILED DESCRIPTION OF THE PREFERRED EMBODIMENTS

The idea of the present invention is to control handover between a first technology network and a second technology network by detecting information about regions of an area of the first technology network, and deciding initiating a handover procedure between the first and second technology networks based on the detected region information. The first technology network may be a WLAN and the second technology network may be a cellular network. However, it is to be noted that the present invention is not restricted to any specific radio technology.

The regions may comprise border regions of an area of the first technology network and non-border regions of this area. Moreover, the handover procedure may be separated in a phase 1 in which handover is prepared and a phase 2 in which handover is carried out. Based on the detected region information, the entire handover procedure can be carried out at once.

Initiating a handover procedure may include performing an entire handover procedure or only preparing the handover on the basis of the detected region information, or preparing and performing the handover procedure separately on the basis of the region information.

In addition, the handover decision may be based on movement information. Region information detected at certain time instances is stored and on the basis of this it can be predicted whether a handover procedure should be carried out. Again, the handover procedure may comprise an entire handover procedure, handover preparing, or separate handover preparing and performing actual handover.

Figure 2:
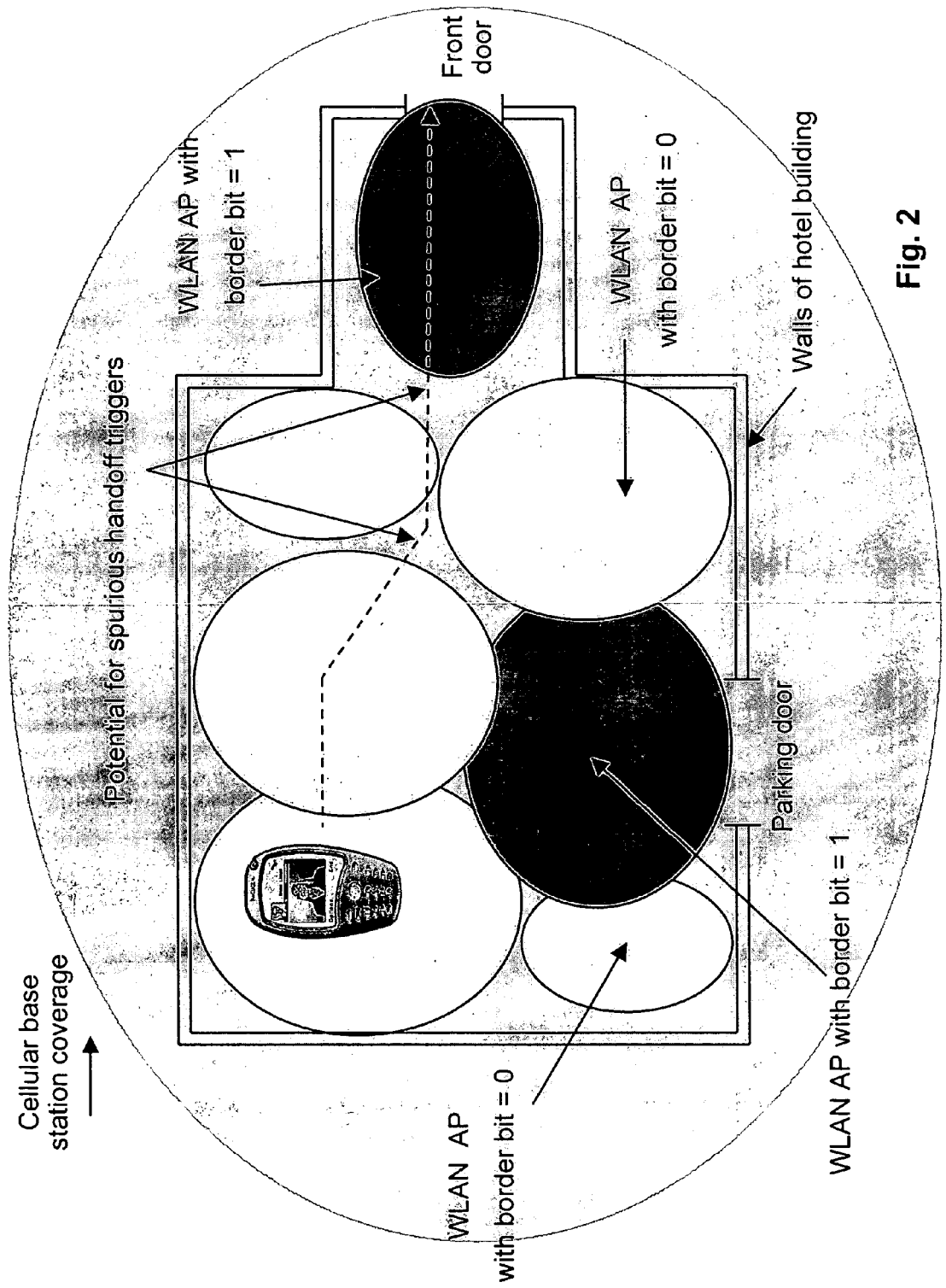
FIG. 2 shows a plan of a hotel building with WLAN hot-spot coverage and a path of a mobile user for illustrating an embodiment of the present invention.

According to embodiments of the invention, smart handover or handoff decision policies of the following nature are implemented:

Policy 1: An inter-technology handoff to the second technology network, e.g. a cellular network, is initiated conservatively when a user of a mobile terminal or mobile node is still well within an area of the first technology network, e.g. a WLAN footprint as shown in FIG. 2, in order to reduce the number of spurious handoff triggers. In contrast thereto, the inter-technology handoff is initiated more aggressively (or even proactively to minimize the latency of handoff) when the user is roaming at the boundary of WLAN coverage.

Policy 2: Connectivity only with WLAN is kept as long as the user remains within the WLAN footprint. If the WLAN signal strength drops while the user is still within the footprint, the mobile terminal waits for regaining connectivity to WLAN rather than initiating handoff to the cellular network. This is in contrast to policy 1, as here the session is not handed off to the cellular network even if the loss in WLAN coverage happens to be a prolonged one. Rather, in this case the user might try to move around in hope of regaining strong WLAN signal. However, once the user leaves the hot spot premises, session may be handed off to the cellular network (possibly after permission from the user). Such a policy is appropriate for, among others, casual and entertainment applications such as streaming of news or sport events, gaming etc., in which the user is willing to move around in the WLAN footprint till he receives a strong signal, without really disrupting the user experience. Also, for such applications, the user would probably not want to use the more expensive cellular connectivity. Thus, a quick handoff to cellular is not desired and spurious loss of coverage is tolerable for the benefit of cheaper access.

The handoff policies as described above can be simultaneously applied to different applications. For example, policy 1 for voice calls and policy 2 for entertainment applications such as games.

For enabling implementation of such policies, an indication of regions in the area of the first technology network is used. According to an embodiment, a border bit in beacons of those access nodes to the first technology network, e.g. those WLAN access points APs, which provide coverage at the boundary of a hot-spot wireless footprint is used. In other words, these are the APs through the coverage of which a mobile user can practically exit (or enter) the hot spot coverage, e.g. an AP providing coverage at the building door (see FIG. 2). The border bit has a value 0 for other APs in the coverage area.

Figure 1:
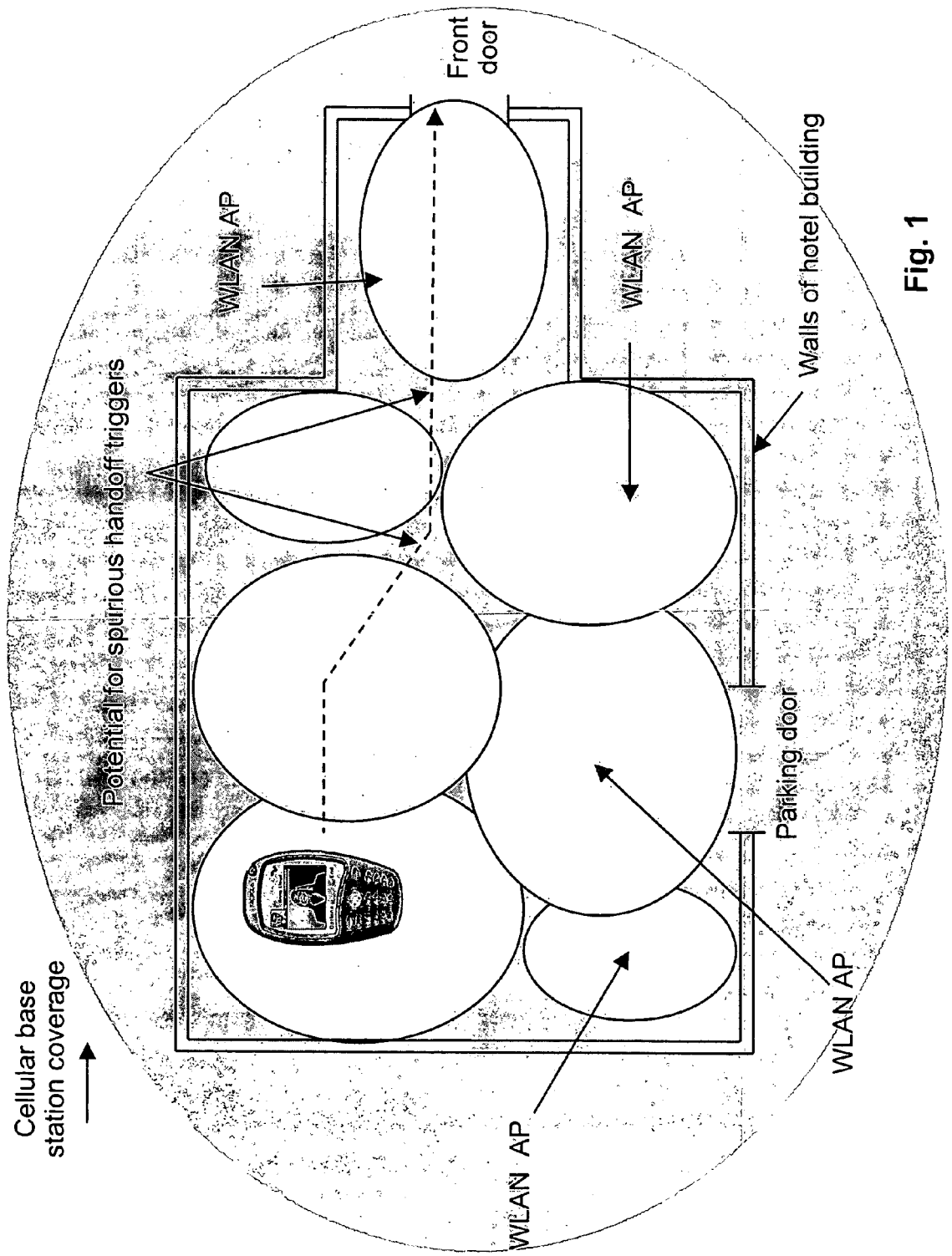
FIG. 1 shows a plan of a hotel building with WLAN hot-spot coverage and a path of a mobile user for illustrating problems encountered with the prior art.

FIG. 2 shows a plan of a hotel building with WLAN hot spot coverage and a path of a mobile user. At exit or enter regions "parking door" and "front door", WLAN APs with a border bit 1 are located. The footprints of the APs with a border bit 1 are shown as gray circles in FIG. 2. The footprints of the APs with a border bit 0 are shown as bright circles. It should be noted that the various footprints are depicted by regular circular shapes in FIGS. 1 and 2 for the sake of illustration only. In practice, the shapes of footprints can be arbitrary due to factors such as physical obstacles (walls, metal objects), environmental conditions affecting signal propagation, movement of objects in the vicinity as well as due to intentional factors such as use of directional or sectorized antennas. Even then, the teachings of the invention are applicable similarly.

Figure 3:
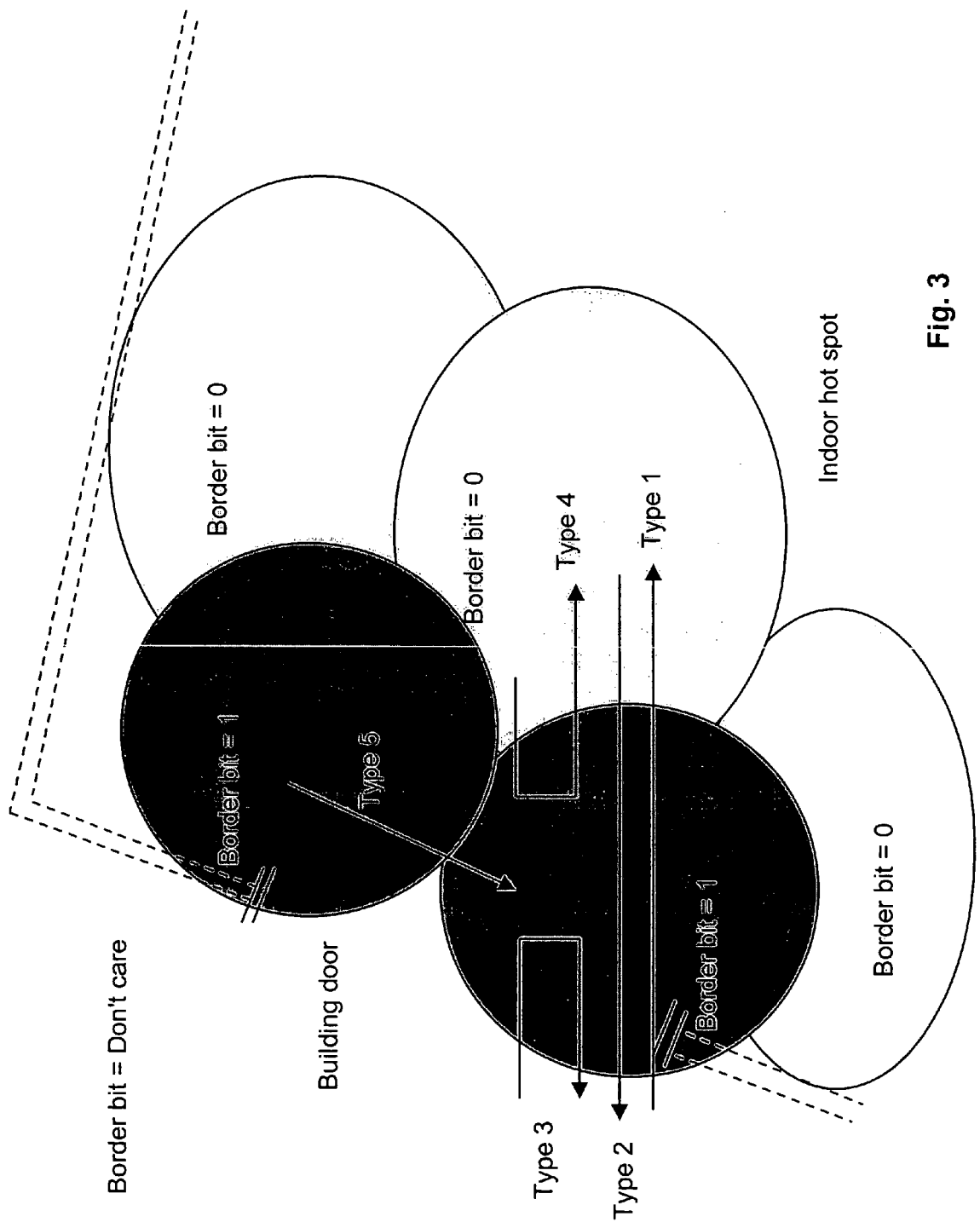
FIG. 3 shows possible patterns of mobile node movement near the boundary of a hot spot wireless footprint for illustrating an embodiment of the present invention.

According to a further embodiment, the pattern of movement of the mobile node MN can be uniquely detected as one of the following types as shown in FIG. 3: (type 1) moving into the hot spot coverage, (type 2) moving out of the hot spot coverage, (type 3) moving into the border cell of hot spot from outside and returning outside, (type 4) moving into the border cell of hot spot from inside and turning back, or (type 5) traveling along the border cells.

To enable such unique detection, a non-border AP is placed in the WLAN area such that it has overlapping coverage with that of a border AP. In other words, there should be no gap in coverage just before (on the inward side of the hot spot) the border AP. Also, there should not be a gap in coverage between the adjacent border APs. Then, by considering the current and past values of the border bit, one of the above types can be uniquely identified and can be used in handoff decision which will be described in more detail later.

Mobile nodes or mobile terminals can make use of either or both of the above provisions for smart inter-technology handoff decisions.

Embodiments of the invention affect on the side of an access node of the first technology network, e.g. WLAN AP side, as well as on mobile terminal side.

As described above, on the AP side two methods are proposed:

Method (A): Incorporating a "border bit" in the AP beacon. Border bit=1 for those APs from which the user can practically exit (or enter) the hot spot coverage. Border bit=0 for other APs.

Method (B): Always placing an AP having overlapping coverage with that of the border AP. In other words, one should not keep a gap in coverage just before (on the inward side of hot spot) the border AP. Also, one should not keep a gap in coverage between the border APs.

On the mobile terminal side, an appropriate decision logic is provided to use the above provisions on AP side which will be described in the following.

Now, embodiments are described which use method (A) to reduce spurious handoffs and improve the performance of proactive handoffs.

1. Reducing the Number of Spurious Handoff Triggers:

By merely tracking the border bit in APs (see Method (A) above), the mobile terminal can significantly reduce the occurrence of spurious handoff triggers caused by short-lived drop in WLAN signal strength. For this purpose, the mobile terminal may use the procedure illustrated in FIG. 4 to implement Policy 1 described above.

Figure 4:
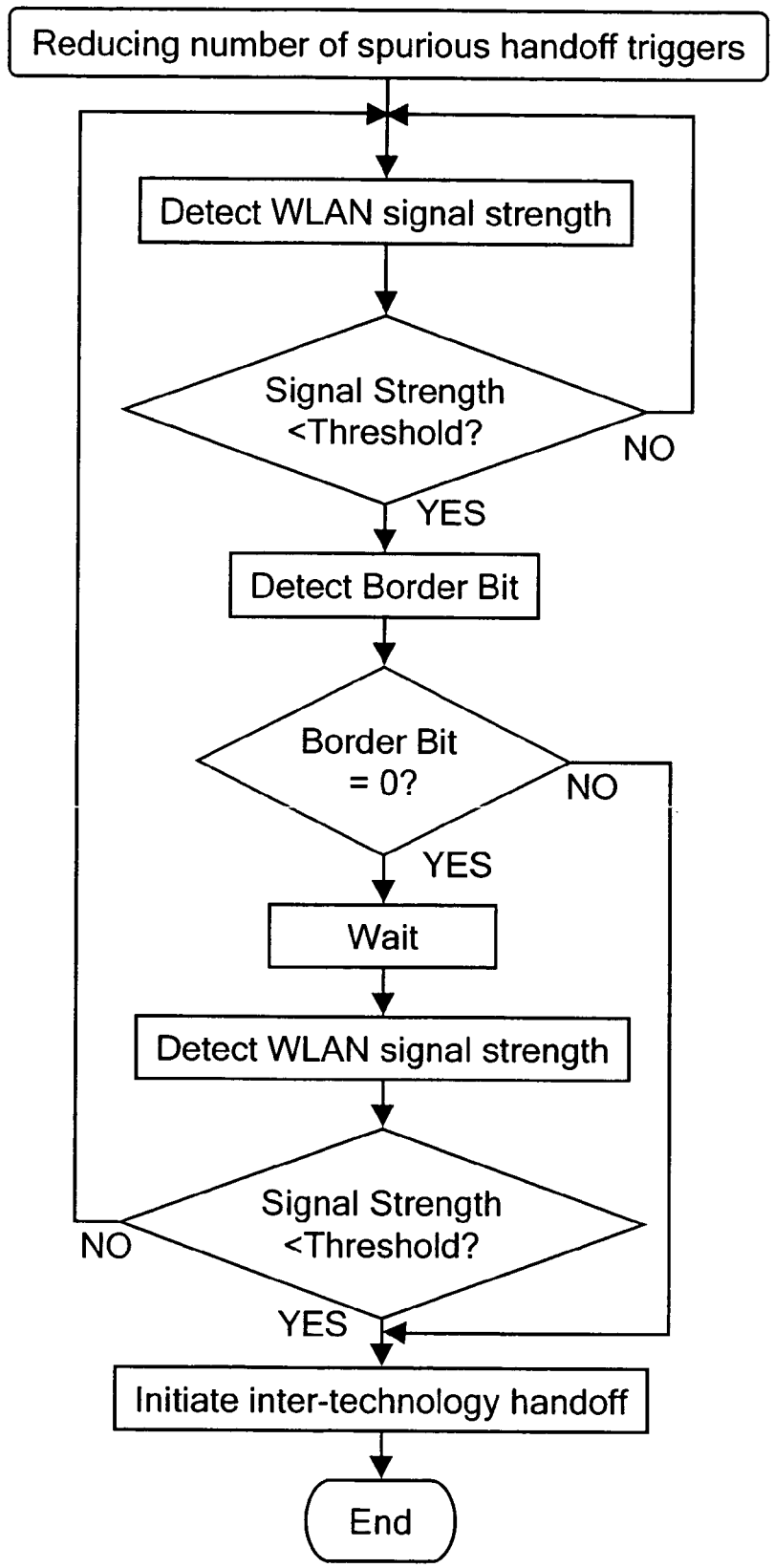
FIG. 4 shows a flow chart illustrating a process for reducing the number of spurious handoff triggers according to an embodiment of the present invention.

In a first step in FIG. 4, a WLAN signal strength is detected by the mobile terminal from a signal received from a WLAN AP with which the mobile terminal currently is connected. In case the WLAN signal strength is less a predetermined threshold, the process goes to a next step where a border bit is detected by the mobile terminal in the beacon of the AP from which the signal strength has been detected. In case the detected border bit is equal to 0, i.e. the mobile terminal is in a non-border region of the WLAN area (see FIG. 2 or FIG. 3), the mobile terminal waits for T seconds before it initiates inter-technology handoff, in order to try to filter out spurious handoff triggers. After the waiting interval, the WLAN signal strength is detected again and if the detected WLAN signal strength is less than a predetermined threshold, an inter-technology handoff is initiated. In other words, in case the detected border bit indicates a non-border region, handoff is initiated conservatively. The thresholds shown in FIG. 4 can be equal or different in which the threshold after the waiting interval may be less than the former one.

However, in case the detected border bit is equal to 1, i.e. the mobile terminal is in a border region of the WLAN area, the inter-technology handoff is initiated immediately, in order to try to avoid latency since the need of a handoff is a high possibility in the border region. In other words, in case the detected border bit indicates a border region, handoff is initiated aggressively.

Figure 5:
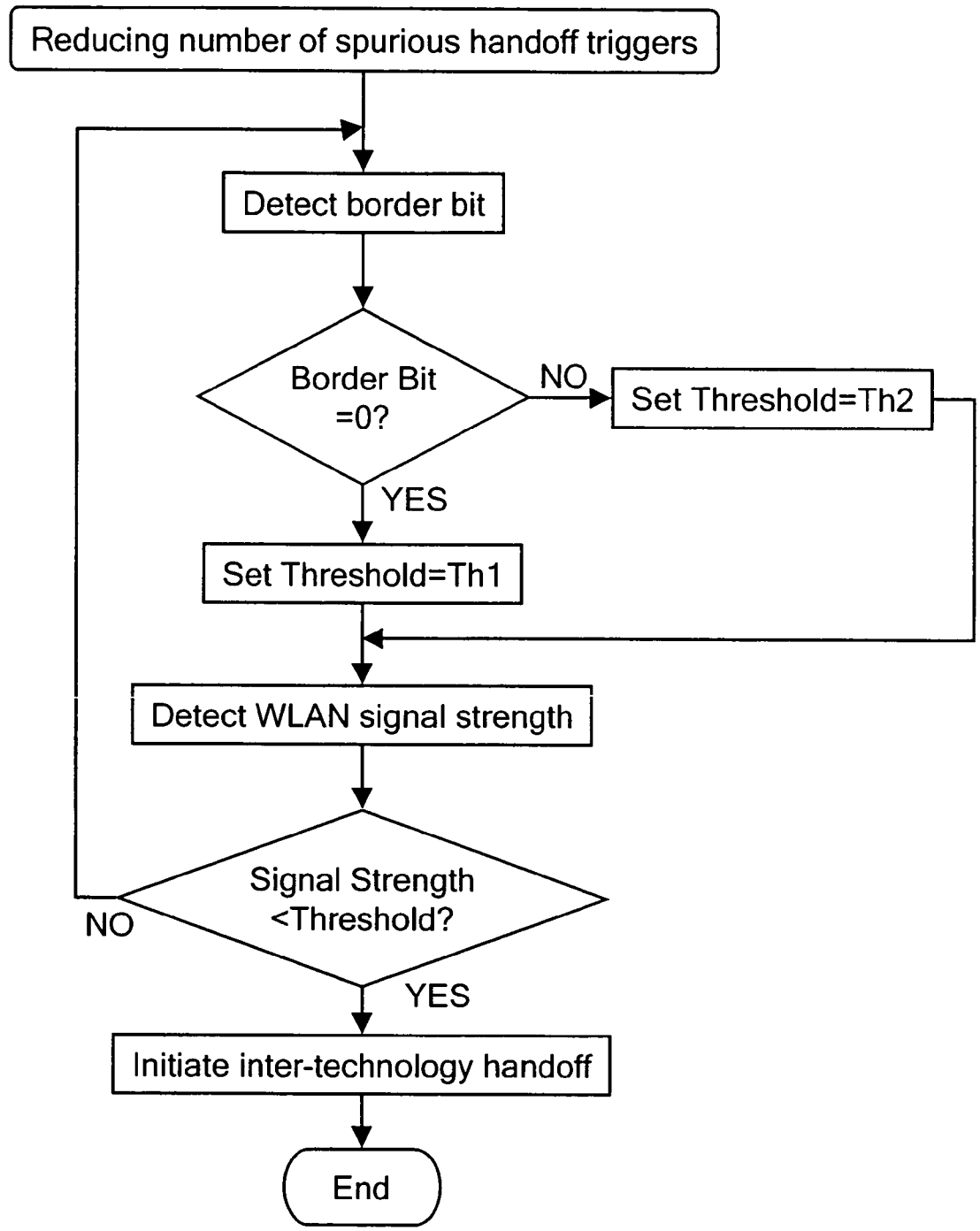
FIG. 5 shows a flow chart illustrating a process for reducing the number of spurious handoff triggers according to an alternative embodiment of the present invention.

According to an alternative embodiment, the mobile terminal can use the following logic as illustrated in FIG. 5.

In a first step, a border bit is detected in the beacon of an AP with which the mobile terminal is connected. In case the border bit is equal to 0, a threshold is set to Th1, and in case the border bit is equal to 1, the threshold is set to Th2. Note that Th2 typically should be bigger than Th1. Then, the WLAN signal strength is detected and, in case the WLAN signal strength is less than the threshold, inter-technology handoff is initiated immediately.

Figure 6:
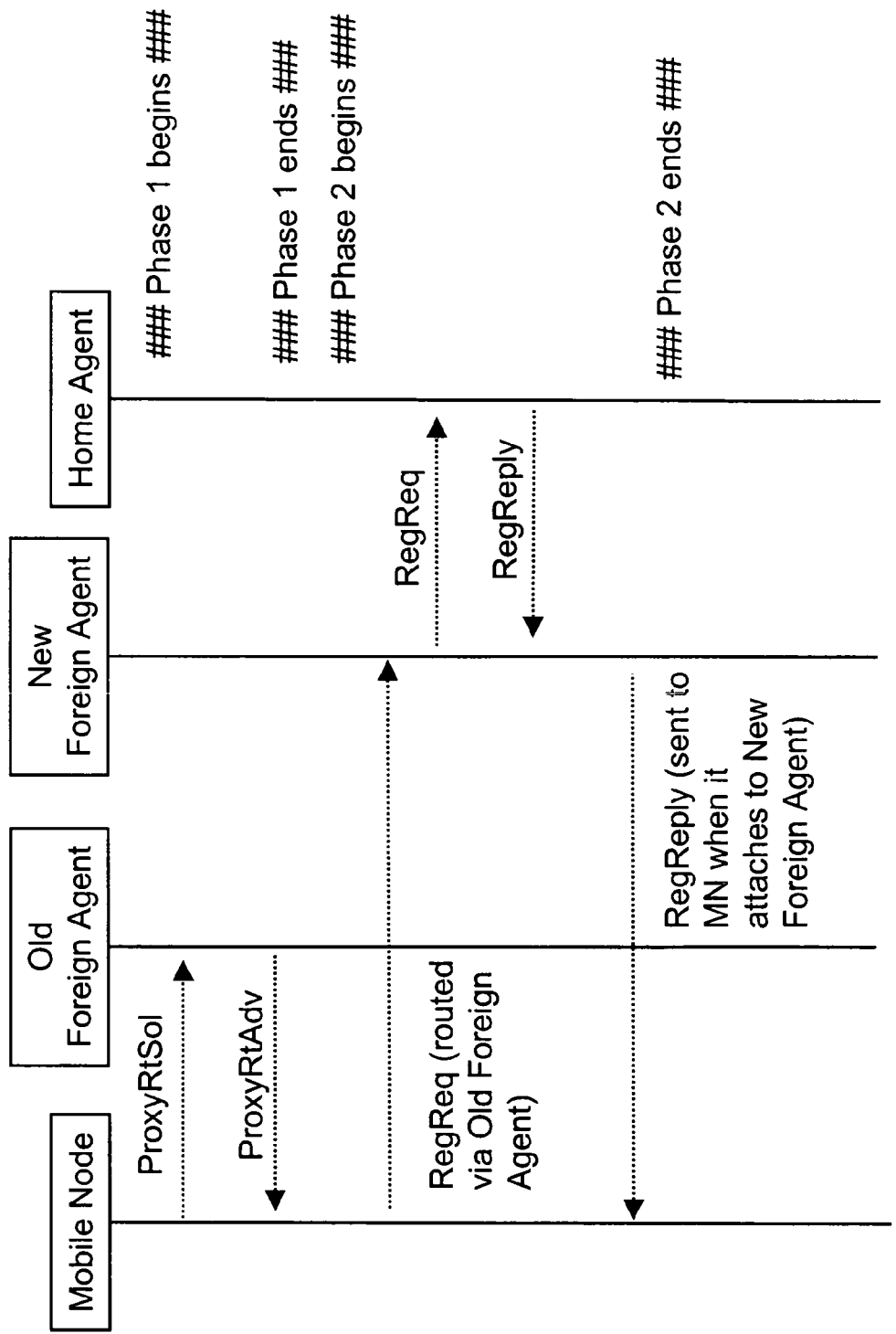
FIG. 6 shows a diagram illustrating a low latency handoff in mobile IPv4 in "pre-registration" mode.
Figure 7:
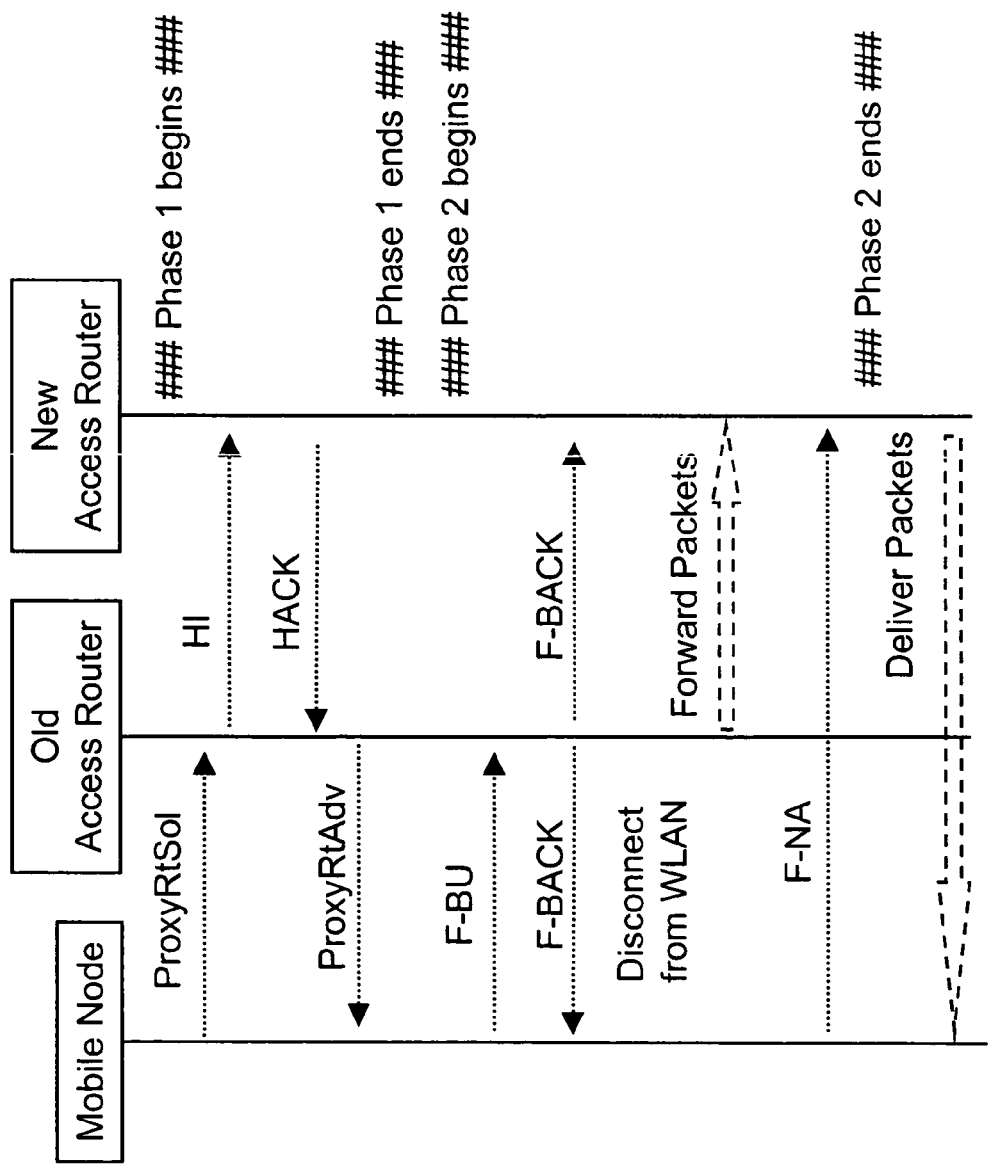
FIG. 7 shows a diagram illustrating fast handoff in mobile IPv6 in "anticipated" mode.

2. Implementing Proactive Handoff Procedures:

The proposed methods on AP side can be used in conjunction with certain handoff schemes relying on proactive procedures. FIGS. 6 and 7 show such handoff schemes. In particular, the scheme according to FIG. 6 shows Low Latency Handoff for Mobile IPv4 in "pre-registration" (see "Low Latency Handoffs in Mobile IPv4", draft-ieff-mobileip-low-latency-handoffs-v4-04.txt, June 2002) mode. The scheme according to FIG. 7 shows Fast Handoff for Mobile IPv6 in "anticipated" mode (see "Fast Handovers for Mobile IPv6", draft-ieff-mobileip-fast-mipv6-05.txt, September 2002). FIGS. 6 and 7 also show the logical partitioning of each of the handoff schemes into two phases: Phase 1, i.e. preparing a handover procedure, which is the proactive phase and needs to be completed when WLAN signal is still strong, and Phase 2, i.e. performing actual handover, which is reactive, i.e., can be initiated after WLAN signal starts to fade noticeably.

In particular, with respect to the low latency handoff scheme shown in FIG. 6, with the beginning of handoff phase 1, a mobile node sends a proxy router solicitation message ProxyRtSol to an old foreign agent still serving the mobile node, e.g. to an agent of the first technology network such as WLAN. As a response, the old foreign agent transmits a proxy router advertisement message ProxyRtAdv back to the mobile node. After that phase 1 is completed.

With the beginning of handoff phase 2, the mobile node sends a registration request message RegReq to a new foreign agent to serve the mobile node, e.g. to an agent of the second technology network such as cellular network, which message may be routed via the old foreign agent. The new foreign agent forwards the registration request to a home agent of the mobile node, and in response thereto the home agent sends a registration reply message RegReply back to the new foreign agent which forwards the registration reply to the mobile node when the mobile node attaches to the new foreign agent. After that phase 2 is completed.

According to the fast handoff scheme shown in FIG. 7, with the beginning of handoff phase 1 a mobile node sends a proxy router solicitation message PrRtSol to an old access router still serving the mobile node, e.g. to an access router of the first technology network such as WLAN. In response thereto the old access router sends a handover initiate message HI to a new access router, e.g. to an access router of the second technology network such as cellular network, which responds by sending a handover acknowledgement message HACK back to the old access router. After receiving the acknowledgement the old access router sends a proxy router advertisement message PrRtAdv to the mobile node. After that, phase 1 is completed. With the beginning of handoff phase 2, the mobile node sends a fast binding update message F-BU to the old access router. In response thereto the old access router transmits a fast binding acknowledgement message F-BACK to the mobile node and the new access router. After that the mobile node disconnects from the network of the old access router, e.g. the WLAN, and the old access router forwards packets to the new access router. Thereafter, with the sending of a fast neighbour advertisement message F-NA, phase 2 is completed and packets can be delivered directly from the new access router to the mobile node.

The Method (A) on AP side can be combined with such handoff schemes according to the following embodiments.

Figure 8:
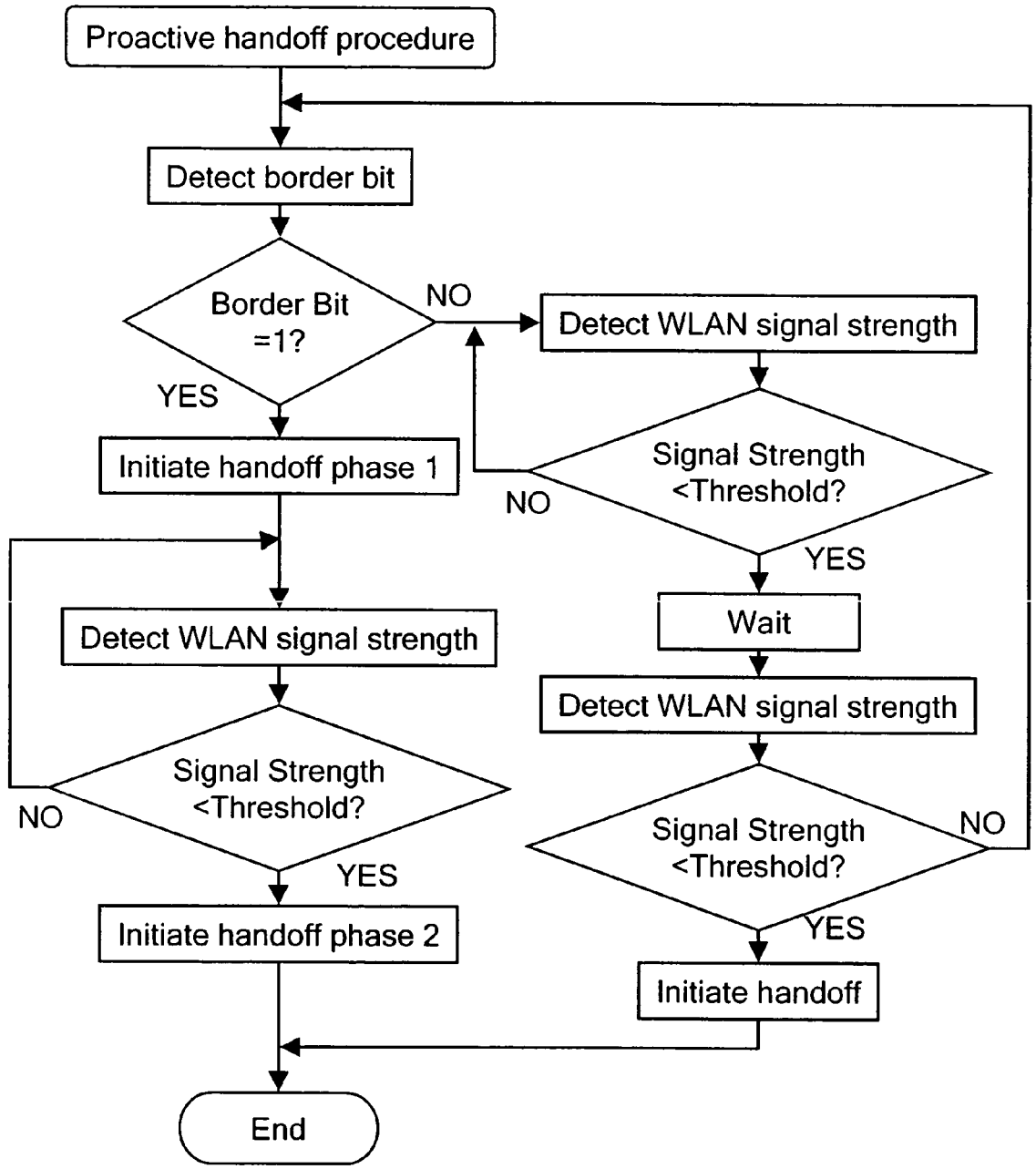
FIG. 8 shows a flow chart illustrating a proactive handoff procedure according to an embodiment of the present invention.

An embodiment of a proactive handoff procedure is shown in FIG. 8. In a first step, the mobile node or mobile terminal detects a border bit in the beacon of a signal received from an access node such as a WLAN AP with which the mobile node is connected. In case the border bit is equal to 1, i.e. the mobile node is in a border-region of the WLAN area, in order to be proactive, handoff phase 1 as described above is initiated, since the need of an inter-technology handoff in the middle of session is a high possibility when the mobile node is in the border area. After that, WLAN signal strength is detected by the mobile node from the signal received from the AP, and while the detected WLAN signal strength is larger than a predetermined threshold the mobile node remains in a waiting state. When the signal strength declines under the threshold, handoff phase 2 as described above is initiated.

In case the detected border bit is equal to 0, i.e. the mobile node is in a non-border region of the WLAN area, the need of an inter-technology handoff in the middle of session is a small possibility so that handoff phase 1 is not started here to avoid potential false start. The mobile node detects WLAN signal strength from the signal transmitted from the AP to which the mobile node is connected, and while the WLAN signal strength is larger than a predetermined threshold, the mobile node remains in a waiting state, since in this situation the signal strength can go down due to discontinuous coverage in hot spot.

Figure 9:
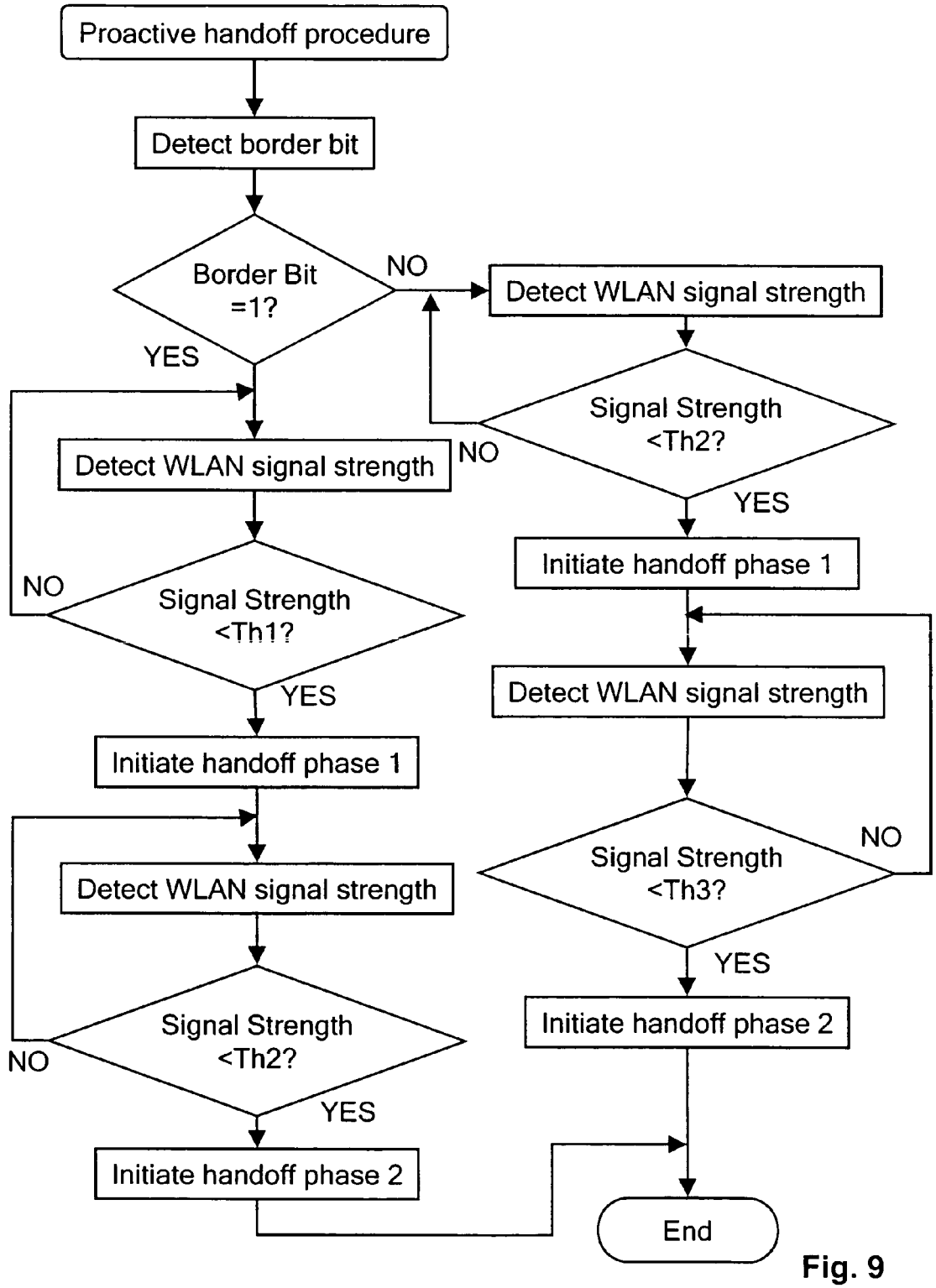
FIG. 9 shows a flow chart illustrating a proactive handoff procedure according to an alternative embodiment of the present invention.

Then, after the signal strength has declined below the threshold, the mobile node waits for T seconds in order to filter spurious triggers. Finally, if the WLAN signal strength has fallen below a predetermined threshold which may be less than the above-mentioned threshold, entire handoff process is initiated. According to an alternative embodiment of the proactive handoff procedure, multiple thresholds can be used, for example Th1>Th2>Th3. FIG. 9 shows such embodiment.

In a first step in FIG. 9, a border bit is detected by the mobile node from a beacon of the WLAN AP with which the mobile node is connected. In case the border bit is equal to 1, i.e. the mobile node is in a border region of the WLAN area and the need of an inter-technology handoff in the middle of session is a high possibility, the mobile node waits while a detected WLAN signal strength is larger than a predetermined threshold Th1. After the signal strength has declined below Th1, in order to be proactive, handoff phase 1 is initiated.

After initiation of phase 1, the mobile node again detects WLAN signal strength from the AP, and while the detected WLAN signal strength is larger than a predetermined threshold Th2, the mobile node remains in a waiting state. After the signal strength has fallen below Th2, handoff phase 2 is initiated.

In case the detected border bit is equal to 0, i.e. the mobile node is in a non-border region of the WLAN area and the need of an inter-technology handoff in the middle of session is a small possibility, while a detected WLAN signal strength is larger than Th2, the mobile node waits. After the signal strength has fallen below Th2, in order to be proactive, handoff phase 1 is initiated.

After initiation of phase 1, WLAN signal strength is detected again and while the detected WLAN signal strength is larger than a predetermined threshold Th3, the mobile node waits. After the signal strength has fallen below Th3, handoff phase 2 is initiated.

As can be seen from the description of the above embodiments, in case the detected border bit indicates a border region, handoff phases 1 and 2 are initiated more aggressively, and in case the border bit indicates a non-border region, the handoff phases are initiated more conservatively.

It is to be noted that the handoff schemes in FIGS. 6 and 7 are used for the sake of illustration only of how the embodiments of the invention can be used in handoff schemes relying on proactive procedures. There are many other handoff schemes in addition to these that also rely on proactive procedures. (Some of these other schemes may be built around the core of Fast Mobile IP, but are tailored to specific environments.) The handoff schemes in FIGS. 6 and 7 have only moderate amount of proactive procedures, but many others include extensive proactive procedures, e.g., for candidate access router discovery, for establishment on on-demand security associations, for establishment of access network bearers, for service negotiation with target access network, etc., depending upon the environment they operate in. The invention applies to all those as well.

It should be noted that, in practice, mobile nodes may use some method for robust measurement of received signal strength. Examples are use of signal strength averaging windows, exponential averaging of samples of received signal strength, dwell timers, etc.

It is to be noted that it is also possible to build in aggressiveness and conservativeness into handoff logic in a different manner. For example, having different values for the widths of averaging windows or dwell timers, having different values for the coefficient of the exponential averager, etc.

It should be noted that, even though the received signal strength is the parameter used in the illustrations of possible embodiments, mobile nodes may also use other parameters such as SIR (Signal to Interference Ratio) or SNR (Signal to Noise Ratio) in the handoff decision logic.

In the following, it will be described how more precise movement detection scheme can be realized by using method (B) in conjunction with method (A) to implement policies of the nature of Policy 2 described above, in which Policy 2 no handover is carried out while the mobile node is within the WLAN area. For example, for realizing Policy 2, the embodiments illustrated in FIGS. 8 and 9 can be modified by removing the steps after the handoff phase 1 initiation, in which handoff phase 2 is carried out not until after the mobile node has left the WLAN area.

3. Applying Precise Movement Detection in Handoff Decisions:

For those applications which need to predict the precise movement of mobile user as one of the 5 types shown in FIG. 3, an embodiment is provided that applies methods (A) and (B) as described above together to determine the precise type of user's movement. For this purpose, the mobile node is able to store (with proper time-out) the value of border bit in the beacons of previous access node, e.g. previous two APs, that it was connected to. Let us denote a current border bit value by BB(2) and past values by BB(1) and BB(0), respectively. Note that the value "Don't care" denotes the absence of WLAN signal. Then, by virtue of Method (A) and (B) on AP side, it follows:

BB(0)=Don't care, BB(1)=1, BB(2)=0=>Type 1

BB(0)=0, BB(1)=1, BB(2)=Don't care=>Type 2

BB(0)=Don't care, BB(1)=1; BB(2)=Don't care=>Type 3

BB(0)=0, BB(1)=1, BB(2)=0=>Type 4

BB(1)=1, BB(2)=1=>Type 5

In case the mobile node detects movement type 1, the need of an inter-technology handoff back to the cellular network in the middle of session is a small possibility. Hence, when detecting movement from a border region with a border bit of 1 to a non-border region with a border bit of 0, the requirement of a handoff is a small possibility. Moreover, in case movement from outside (border bit=don't care) into the border region and then into the non-border region is detected, this possibility is even smaller. According to Policy 2, this fact may be used as a criterion in the decision whether handoff phase 1 is to be initiated. However, this movement detection may also be used for deciding whether the entire handoff procedure or handoff phase 2 is to be initiated.

In contrast thereto, in case the mobile node detects movement type 2, the need of an inter-technology handoff in the middle of session is a high possibility. Hence, when detecting movement from a non-border region with a border bit of 0 to a border region with a border bit of 1, according to Policy 2, initiation of handoff phase 1 is decided.

In case the mobile node detects movement type 5 or the beginning part of movement type 3, i.e. movement between border regions or into a border region from outside, the requirement of an inter-technology handoff may be a high possibility. Hence, when detecting such movement, according to Policy 2, handoff phase 1 is initiated.

Entire handover decisions, handoff phase 1 decisions according to Policy 2 and handoff phase 2 decisions may be based on the detected movement type alone, or the detected movement type may be a further criterion for handoff decisions such as described with respect to FIGS. 4, 5, 8 and 9.

The above described embodiments significantly improve on the state of the art, though they cannot make the need of a handoff completely predictable. For example, with a proactive handoff process, if the mobile user in the hotel goes to the front desk while in call and then returns to his room (type 4 in FIG. 3), the phase 1 for handoff to cellular network will be initiated. Avoiding such false start seems impractical for any automatic decision scheme that does not rely on human intervention. However, the present invention provides methods for avoiding false initiation of phase 2 of the handoff process (and hence actual handoff) when the user returns to the hotel room.

It is to be understood that the above description of the embodiments of the invention is illustrative of the invention and is not to be construed as limiting the invention. Various modifications and applications may occur to those skilled in the art without departing from the true spirit and scope of the invention as defined by the appended claims.

What is claimed is:

1. A method, comprising:

detecting, by a mobile node, information in a beacon of a first signal received from an access node with which the mobile node is connected;

detecting, by the mobile node, a signal strength from a second signal received from the access node with which the mobile node is connected;

upon indication by the border information in the beacon that the mobile node is in a non-border-region, and upon determination that the signal strength is below a predetermined threshold, the mobile node waiting for a predefined time;

after the predefined time has passed, detecting, by the mobile node, a signal strength from a third signal received from the access node with which the mobile node is connected; and upon determination that the signal strength is still below a predetermined threshold, initiating, by the mobile node, handoff from a first technology network to a second technology network.

2. The method of claim 1, wherein the border information is provided as a border bit.

3. The method of claim 2, wherein if the border bit is equal to 1, the mobile node is in a border-region of an area of the first technology network, and if the border bit is equal to 0, the mobile node is in a non-border-region of the area of the first technology network.

4. The method of claim 1, wherein the first technology network comprises a wireless local access network.

5. The method of claim 1, wherein the second signal comprises either the first signal 5 or another signal.

6. A mobile node apparatus, comprising:
a processor configured to detect border information in a beacon of a first signal received from an access node with which the mobile node apparatus is connected;
detect a signal strength from a second signal received from the access node with which the mobile node apparatus is connected;
upon indication by the border information in the beacon that the mobile node apparatus is in a non-border-region, and upon determination that the signal strength is below a predetermined threshold, the mobile node apparatus waits for a predefined time;
after the predefined time has passed, the mobile node apparatus detects a signal strength from a third signal received from the access node with which the mobile node apparatus is connected; and
upon determination that the signal strength is still below a predetermined threshold, the mobile node apparatus initiates handoff from a first technology network to a second technology network.

7. The apparatus of claim 6, wherein the border information is provided as a border bit.

8. The apparatus of claim 7, wherein if the border bit is equal to 1, the apparatus is in a border-region of an area of the first technology network, and if the border bit is equal to 0, the apparatus is in a non-border-region of the area of the first technology network.

9. The apparatus of claim 6, wherein the first technology network comprises a wireless local access network.

10. The apparatus of claim 6, wherein the second signal comprises either the first signal or another signal.

11. A computer-readable storage medium storing a program for causing a computer to execute:
detecting, by a mobile node, border information in a beacon of a first signal received from an access node with which the mobile node is connected;
detecting, by the mobile node, a signal strength from a second signal received from the access node with which the mobile node is connected;
upon indication by the border information indicates in the beacon that the mobile node is in a non-border-region, and upon determination that the signal strength is below a predetermined threshold, the mobile node waiting for a predefined time;
after the predefined time has passed, detecting by the mobile node a signal strength from a third signal received from the access node with which the mobile node is connected; and
upon determination that the signal strength is still below a predetermined threshold, initiating, by the mobile node, handoff from a first technology network to a second technology network.

12. A mobile node apparatus, comprising:
means for detecting border information in a beacon of a first signal received from an access node with which the mobile node apparatus is connected;
means for detecting a signal strength from a second signal received from the access node with which the mobile node apparatus is connected;
means for, upon indication by the border information in the beacon that the mobile node apparatus is in a non-border-region, and upon determination that the signal strength is below a predetermined threshold, the mobile node apparatus waits for a predefined time;
means for, after the predefined time has passed, detecting a signal strength from a third signal received from the access node with which the mobile node apparatus is connected; and
means for, upon determination that the signal strength is still below a predetermined threshold, the mobile node apparatus initiates handoff from a first technology network to a second technology network.

* * * * *